R. E. HELLMUND.
FIELD CONTROL SYSTEM FOR DYNAMO ELECTRIC MACHINES.
APPLICATION FILED SEPT. 9, 1916.
1,311,513.
Patented July 29, 1919.
3 SHEETS—SHEET 1.
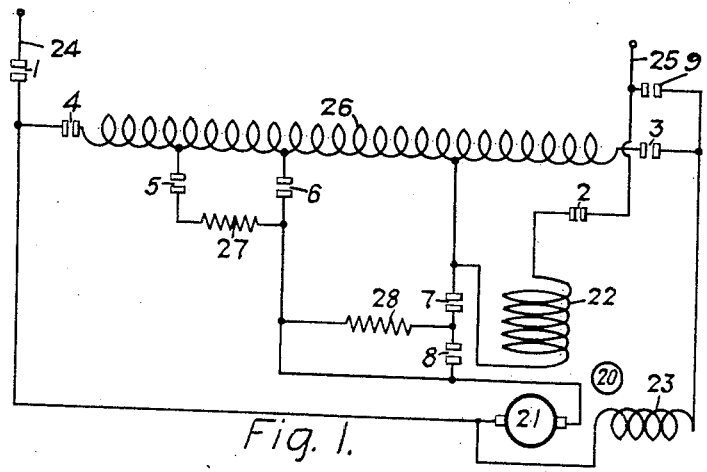
Fig. 1.
|   | 1 | 2 | 3 | 4 | 5 | 6 | 7 | 8 | 9 |
|---|---|---|---|---|---|---|---|---|---|
| A | o | o | o | o | o |   |   |   |   |
| B | o | o | o | o | o | o |   |   |   |
| C | o | o | o | o | o |   |   |   |   |
| D | o | o | o | o |   |   | o | o |   |
| E | o | o | o | o | o |   |   | o |   |
| F | o | o | o | o |   |   |   | o | o |
| G | o | o | o |   |   |   |   | o | o |
| H | o | o | o |   |   |   | o | o | o |
| I | o | o |   |   |   |   | o | o | o |
Fig. 2.
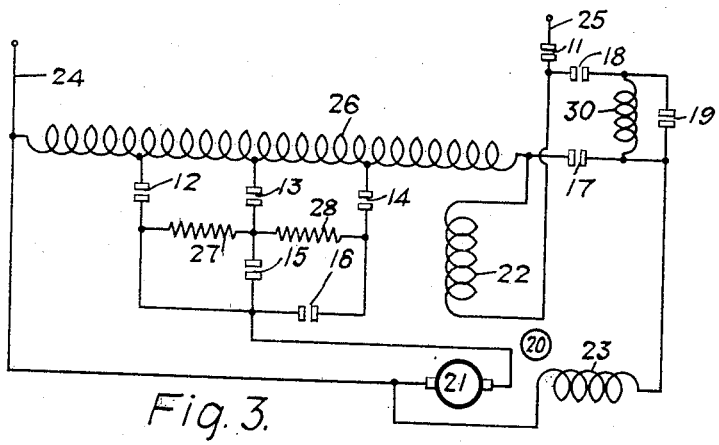
Fig. 3.
|   | 11 | 12 | 13 | 14 | 15 | 16 | 17 | 18 | 19 |
|---|----|----|----|----|----|----|----|----|----|
| A | o  | o  |    |    |    |    | o  | o  |    |
| B | o  | o  |    |    |    |    | o  |    |    |
| C | o  | o  | o  |    |    |    | o  |    |    |
| D | o  |    | o  |    |    |    | o  |    |    |
| E | o  |    | o  | o  |    |    | o  |    |    |
| F | o  |    | o  | o  | o  |    | o  |    |    |
| G | o  |    |    | o  | o  |    | o  |    |    |
| H | o  |    |    | o  | o  | o  | o  |    |    |
| I | o  |    |    | o  | o  | o  |    | o  |    |
| J | o  |    |    |    | o  | o  | o  |    | o  |
| K | o  |    |    |    | o  | o  |    | o  | o  |
Fig. 4.
WITNESSES:
CJRidge,
AHDavis
INVENTOR
Rudolf E. Hellmund.
BY
Wesley G. Carr
ATTORNEY R. E. HELLMUND.
FIELD CONTROL SYSTEM FOR DYNAMO ELECTRIC MACHINES.
APPLICATION FILED SEPT. 9, 1916.

1,311,513.

Patented July 29, 1919.
3 SHEETS—SHEET 2.

WITNESSES:

INVENTOR
Rudolf E. Hellmund
BY
ATTORNEY

R. E. HELLMUND.
FIELD CONTROL SYSTEM FOR DYNAMO ELECTRIC MACHINES.
APPLICATION FILED SEPT 9, 1916.

1,311,513.

Patented July 29, 1919.
3 SHEETS—SHEET 3.

WITNESSES:

INVENTOR
Rudolf E. Hellmund
BY
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC AND MANUFACTURING COMPANY, A CORPORATION OF PENNSYLVANIA.

FIELD-CONTROL SYSTEM FOR DYNAMO-ELECTRIC MACHINES.

1,311,513.  Specification of Letters Patent.  Patented July 29, 1919.

Application filed September 9, 1916. Serial No. 119,266.

*To all whom it may concern:*

Be it known that I, RUDOLF E. HELLMUND, a subject of the Emperor of Germany, and a resident of Swissvale, in the county of Allegheny and State of Pennsylvania, have invented a new and useful Improvement in Field-Control Systems for Dynamo-Electric Machines, of which the following is a specification.

My invention relates to accelerating systems for alternating-current motors of the commutator type, and it has for its object to provide a system of the character designated whereby the motor may be accelerated in a smooth and uniform manner, with an extremely economical consumption of power and with freedom from sparking.

Figure 5:
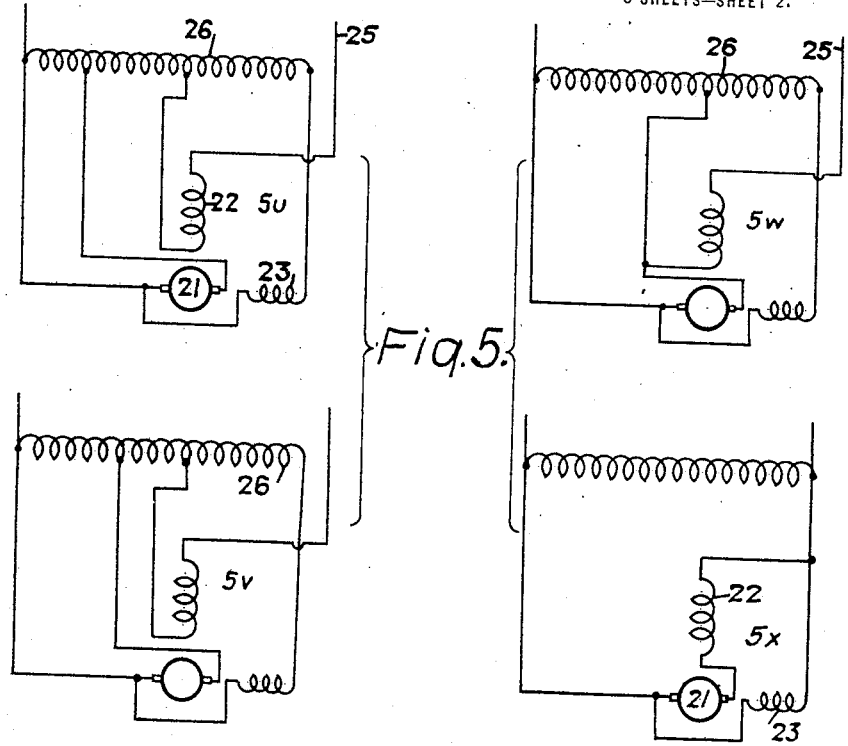
Figure 6:
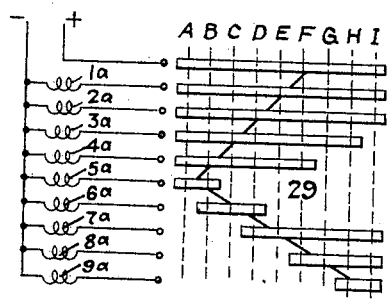
Figure 7:
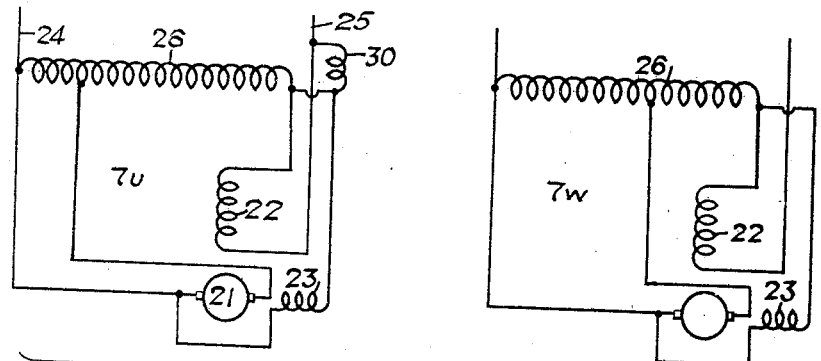
Figure 8:
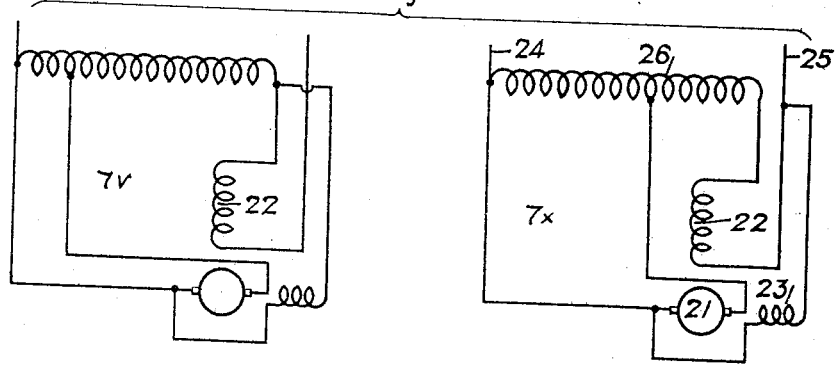
Figure 8:
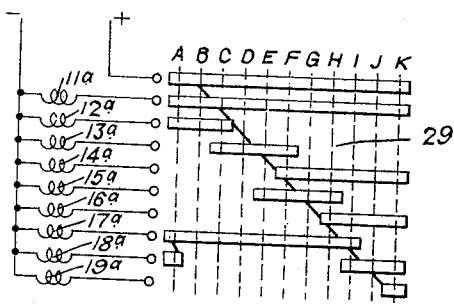

In the accompanying drawings, Figure 1 is a diagrammatic view of a single-phase commutator motor, together with its attendant supply and control circuits embodying a preferred form of my invention; Fig. 3 is a diagrammatic view of a modification of the system shown in Fig. 1; Figs. 2 and 4 are sequence charts illustrating a preferred order of switch operation in the systems of Figs. 1 and 3, respectively, in order to operate the same in accordance with my invention; Fig. 5 is a group of simplified diagrammatic views illustrating the development of the connections in the system of Fig. 1 when the switches thereof are operated in the order indicated in Fig. 2; Fig. 7 is a similar group of simplified diagrammatic views illustrating the development of the connections of the system in Fig. 3; Figs. 6 and 8 are diagrammatic views of suitable control circuits whereby the switches of Figs. 1 and 3, respectively, may be operated in the desired sequence.

In my copending application, Serial No. 35,168, filed June 19, 1915, I describe and claim a system of connections for an alternating-current motor of the commutator type wherein severe sparking at the outset, produced by the transformer action of the exciting field winding upon the short-circuited armature coils undergoing commutation, is largely eliminated by energizing the exciting field winding from a current transformer the primary winding of which is connected in series with the primary leads of the main supply transformer. In the system designated, if it be assumed that the equivalent voltage at starting is one-half the final running voltage, there is a corresponding decrease in the current supplied to the main field winding at starting and such subsequent gradual and automatic increase in said current as is desirable for proper operation.

By the present invention, I provide means whereby at the outset of the starting operation, the exciting field winding is connected directly in series with the primary leads of the main supply transformer, the remaining motor windings being energized through said main transformer as indicated in my copending application, Serial No. 4612, filed January 27, 1915. The system is so arranged that subsequently all of the motor windings are transferred to direct energization from the primary leads of the main transformer. By this means, the desired weak exciting field at starting is readily obtained and, furthermore, the use of the main transformer for voltage regulation of a portion of the motor windings during the starting operation only permits the use of a relatively small and inexpensive transformer.

In a modified form of my invention, I retain the supply transformer in circuit throughout the operation of the motor but I use the same for the energization of the armature windings only, thus permitting a smaller transformer for a given installation than would be permissible with present apparatus.

Other features of my invention will hereinafter more fully appear.

Referring to Figs. 1, 2, 5 and 6, I show an alternating-current motor of the commutator type at 20, said motor comprising an armature 21, an exciting field winding 22 and an inducing field winding 23. Energy for the operation of the motor 20 is derived from suitable supply mains 24 and 25, and an auto-transformer 26 is provided for voltage adjustment. The voltage applied to the armature winding may be adjusted by suitable switches 5 to 8, inclusive, together with preventive devices 27 and 28, all as is known and understood in the art. In like manner, the exciting and inducing field windings may be connected in circuit by the operation of suitable switches 2, 3 and 9 and, furthermore, may be energized through switches 1 and 4.

The switches 1 to 9, inclusive, may be of any desired type, either manually, pneumatically or electrically operated, but may preferably be of the well known electromagnetic type, the operating coils of the various switches being designated as $1^a$ to $9^a$, inclusive, in Fig. 6.

Having thus described the general arrangement of a system embodying my invention, the operation is as follows: The movement of a control drum 29 of Fig. 6 to an initial position A, or other similar operation, first closes the switches 1 to 5, inclusive, and establishes the connections shown in Fig. $5^u$. The armature 21 is connected across a small portion of the auto-transformer 26 at the left hand end thereof, the inducing field winding 23 being connected across the entire transformer 26 and the exciting field winding 22 being connected between the lead 25 and the transformer 26 so that said field winding is excited by the primary supply current.

The control drum 29 is next moved forward through the positions B and C, raising the armature applied voltage and establishing the connections of Fig. $5^v$. Movement of the controller to the positions D, E and F still further increases the armature applied voltage resulting in the connections shown in Fig. $5^w$, wherein one armature terminal and one field terminal are joined to a common point in the transformer 26, the other terminal of the exciting field winding remaining in connection with the supply main 25, as heretofore. The movement of the control drum 29 through the positions G, H and I eliminates the transformer 26 and produces the connections shown in Fig. $5^x$, the exciting field winding 22 being connected in series with the armature 21 and the inducing field winding 23 being connected in shunt around the other two motor windings.

It will be observed that, in Figs. $5^u$, $5^v$ and $5^w$, the exciting field winding is connected in series with one of the primary leads of the regulating transformer and that there is a step-up ratio of transformation to supply the inducing field electromotive force. There is a step-down ratio of transformation to energize the armature winding in Figs. $5^u$ and $5^v$ and, consequently, the exciting field current is less than the armature current, the gradual raising of the armature voltage producing the desired current increase in the exciting field winding. In Fig. $5^x$, the transformer is entirely eliminated, permitting the use of a small transformer.

As the armature and cross field currents bear a fixed relation to each other, because of the transformer ratio between the respective windings, the exciting field winding may, if desired, be excited by the cross field current rather than by the armature current in the connections of Fig. 5, because of adjustment of the number of turns therein having been made to compensate for the proportionality factor between the armature and cross field currents.

Referring to the form of my invention shown in Figs. 3, 4, 7 and 8, a single-phase commutator motor and a supply transformer are provided as before, similar parts being similarly designated. A preventive device 30 of the reactive type is supplied in addition to the elements shown in Fig. 1, and said reactive device may be short circuited by a suitable switch 19.

The movement of the control drum 29, in Fig. 8, to the position A closes the switches 11, 12, 17 and 18, establishing the connections shown in Fig. $7^u$. The transformer winding 26 is connected between the mains 24 and 25 through the exciting field winding 22, as heretofore, but the reactive device 30 is connected in shunt thereto to still further reduce the amount of current flowing therein. The armature winding 21 and the inducing field winding 23 are connected as in Fig. $5^w$. The movement of the control drum 29 to the position B opens the switch 18, eliminating the reactive device 30 and establishing the connections shown in Fig. $7^v$ which are substantially identical with those of Fig. $5^u$, all of the primary current flowing through the exciting field winding 22. The accelerating positions C, D, E, F, G and H are employed to manipulate the switches 12 to 16, inclusive and to raise the applied armature voltage, resulting in the connections of Fig. $7^w$ which is similar to Fig. $5^v$ except that the primary portion of the auto-transformer 26 comprises all the turns thereof and there is no step-up transformer ratio for the electromotive force of the inducing field winding 23.

For the concluding operation of the accelerating process, the switches 17, 18 and 19 are operated as indicated in accelerating positions I, J and K to produce the connections of Fig. $7^x$. The exciting field winding 22 remains in series with the primary portion of the auto-transformer 26, the armature current being derived from a portion of said auto-transformer and the inducing field winding 23 being connected directly across the mains 24 and 25. Thus, the transformer 26 is employed solely for the energization of the armature 21 and may, therefore, be smaller than would otherwise be permissible.

While I have shown my invention in a plurality of forms it will be obvious to those skilled in the art that it is susceptible of various minor changes and modifications without departing from the spirit thereof and I desire, therefore, that only such limitations shall be placed thereupon as are imposed by the prior art or as are set forth in the appended claims.

I claim as my invention:

1. The combination with supply mains and an alternating-current motor of the commutator type having an armature winding and exciting and inducing field windings, of an auto-transformer supplied from said mains, means for connecting the armature between selected points in the auto-transformer winding, and means for connecting the exciting field winding in series with the auto-transformer winding between one supply main and a point in the auto-transformer winding, and for connecting the exciting field winding in series with one of the other motor windings alternatively.

2. The combination with supply mains and an alternating-current motor of the commutator type having an armature and an exciting field winding, of an auto-transformer supplied from said mains, means for connecting the armature between selected points in the auto-transformer winding, means for connecting the exciting field winding in series with the auto-transformer winding between one supply main and a point in the auto-transformer winding, and for also connecting it in series with the armature for other conditions of operation.

3. The combination with supply mains and an alternating-current motor of the commutator type provided with at least one working circuit and a main field-exciting circuit, of a transformer supplied from said mains, means for connecting the armature between selected points in the transformer winding, means for connecting the main field-exciting circuit in series with the transformer winding between one supply main and a selected point in the transformer winding, and for also connecting the exciting circuit in series with the working circuit for other conditions of operation.

4. The method of operating a dynamo-electric machine in conjunction with supply mains and a transformer winding, said machine having at least one working circuit and a main field-exciting circuit that consists in making the following connections: for low speeds, connecting the working circuit between selected points in the transformer winding and connecting the field-exciting circuit in series with one supply main and a portion of the transformer winding; and for higher speeds, connecting the working circuit in series relation with one of the other circuits, rendering the transformer inoperative and connecting the entire series circuit directly to the supply mains.

5. The method of operating a dynamo-electric machine in conjunction with supply mains and a transformer winding, said machine having at least one working circuit, a main field-exciting circuit and an inducing field-winding circuit that consists in making the following connections: for low speeds, connecting the working circuit between selected points in the transformer winding, connecting the field-exciting circuit in series with one supply main and a portion of the transformer winding, and connecting the inducing field-winding circuit across the transformer winding; and for higher speeds, connecting the working circuit and the field-exciting circuit in series relation across the supply mains and connecting the inducing field-winding circuit also across said mains.

In testimony whereof, I have hereunto subscribed my name this 1st day of Sept. 1916.

RUDOLF E. HELLMUND.

Copies of this patent may be obtained for five cents each, by addressing the "Commissioner of Patents, Washington, D. C."